(12) United States Patent
Raisanen et al.

(10) Patent No.: US 6,633,540 B1
(45) Date of Patent: Oct. 14, 2003

(54) REAL-TIME TRAFFIC SHAPER WITH KEEP-ALIVE PROPERTY FOR BEST-EFFORT TRAFFIC

(75) Inventors: Vilho I. Raisanen, Helsinki (FI); Jan-Erik Ekberg, Helsinki (FI)

(73) Assignee: Nokia Internet Communications, Inc., Mountain View, CA (US)

( * ) Notice: Subject to any disclaimer, the term of this patent is extended or adjusted under 35 U.S.C. 154(b) by 0 days.

(21) Appl. No.: 09/346,747

(22) Filed: Jul. 2, 1999

(65) Prior Publication Data (65)

(51) Int. Cl.[7] ............... H04J 1/16; H04J 3/14
(52) U.S. Cl. ............... 370/230.1; 370/395.2; 370/412
(58) Field of Search ............... 370/230, 230.1, 370/229, 231, 232, 235, 235.1, 236, 412, 413, 415, 417, 422, 428, 429, 395.1, 395.21, 395.2, 395.4–395.5

(56) References Cited

U.S. PATENT DOCUMENTS 6,023,733 A * 2/2000 Periasamy et al. .......... 709/241
6,188,698 B1 * 2/2001 Galand et al. .............. 370/412
6,215,789 B1 * 4/2001 Keenan et al. ............. 370/399
6,335,927 B1 * 1/2002 Elliott et al. ............... 370/352

FOREIGN PATENT DOCUMENTS

WO 98 28938 7/1998
WO 99 13624 3/1999
WO 00 30307 5/2000

* cited by examiner

Primary Examiner—Ajit Patel
Assistant Examiner—Raj Jain
(74) Attorney, Agent, or Firm—Antonelli, Terry, Stout & Kraus, LLP; Hung H. Bui, Esq.

(57) ABSTRACT

An advanced traffic shaper is provided for shaping real-time traffic in an IP-based network while simultaneously providing keep-alive bandwidth for best-effort traffic. The traffic shaper comprises a packet classifier coupled to receive an incoming packet from the network and to classify the incoming packet as one of a real-time packet and a best-effort packet; a packet discarding block coupled to perform traffic shaping of the incoming packet from the packet classifier and discard the incoming packet in accordance with traffic shaping parameters; connection queues coupled to temporary store real-time packets and best-effort packets from the packet discarding block, respectively; and a packet scheduling block coupled to send the real-time and best-effort packets from the connection queues to an outgoing device in accordance with the traffic shaping parameters.

19 Claims, 8 Drawing Sheets

REAL-TIME TRAFFIC SHAPER WITH KEEP-ALIVE PROPERTY FOR BEST-EFFORT TRAFFIC

BACKGROUND OF THE INVENTION

1. Technical Field

The present invention relates to traffic control in a data communication system and more particularly, relates to a traffic shaper for controlling traffic bandwidth usage in an IP (Internet Protocol) network to guarantee proper QoS (Quality of Service) for different types of real-time traffic applications such as interactive audio and/or video while concomitantly providing keep-alive bandwidth for best-effort traffic.

2. Related Art

In recent years, increased usage of the Internet has resulted in scarcity of network capacity, and compromised performance of traditional applications. At the same time, new applications such as interactive audio and/or video, including video-conferencing or Voice over IP (VoIP) have emerged which demand much improved QoS (Quality of Service). As a result, network service providers (both enterprise and traditional ISPs) are pressured to provide different customers alternative levels of service.

One of the most promising of these services is Differentiated Services (DiffServ), which provides for classification of different flows of IP data packets and prioritizing scheduling of these IP flows in routers. These schemes work best when traffic bandwidth of individual end users is bounded and contains as small fluctuations as possible. The boundedness property of IP data packets can be achieved by using traffic shaping, or limiting the traffic bandwidth to an agreed-upon number of IP data packets per time unit and discarding excess traffic.

Several traffic shaping techniques may be provided to shape the traffic so that the traffic does not exceed a predetermined transmission rate for each destination in an IP network. Existing IP traffic shapers are designed to limit bandwidth usage of TCP (Transfer Control Protocol) traffic. Subsequently, those traffic shapers are not suitable for special requirements of high-priority, interactive real-time traffic with small packet size, such as video-conferencing or Voice over IP (VoIP). At the same time, it is desirable to prevent TCP connections from being exhausted of bandwidth. Accordingly, there is a need for an advanced traffic shaper advantageously configured for priority forwarding of real-time traffic while providing keep-alive bandwidth for "best-effort" traffic at the same time. Also needed is an advanced traffic shaper used together with QoS (Quality of Service) core network technology, such as an ATM network.

SUMMARY OF THE INVENTION

Accordingly, various embodiments of the present invention are directed to an advanced traffic shaper for shaping real-time traffic in an IP-based network while simultaneously providing keep-alive bandwidth for best-effort traffic. Such a traffic shaper may be an algorithm integrated into existing operating system (OS) of a host processor and/or a computer readable medium for use in a host processor for priority forwarding for real-time traffic and avoiding correlated loss for real-time streams while providing keep-alive bandwidth for best-effort traffic. In addition, the traffic shaper may be installed in the host processor of a source terminal or a destination terminal in an IP-based network which uses a bandwidth-limited IP link for providing connection between the source terminal and the destination terminal.

In accordance with the present invention, the traffic shaper may comprise a packet classifier coupled to receive an incoming packet from the network and to classify the incoming packet as one of a real-time packet and a best-effort packet; a packet discarding block coupled to perform traffic shaping of the incoming packet from the packet classifier and discard the incoming packet in accordance with traffic shaping parameters; connection queues coupled to temporary store real-time packets and best-effort packets from the packet discarding block, respectively; and a packet scheduling block coupled to send the real-time and best-effort packets from the connection queues to an outgoing device in accordance with the traffic shaping parameters.

The connection queues may include a real-time queue for storing the real-time packets and a best-effort queue for storing the best-effort packets. Both real-time and best-effort queues correspond to packet buffers constructed from first-in-first-out (FIFO) memory for storing real-time packets and best-effort packets, respectively.

The packet discarding block may be executed to discard an incoming packet by steps of: determining whether the real-time and best-effort queues are empty; when the real-time and best-effort queues are empty, resetting internal counters and a scheduled transmission time of the next incoming packet; determining whether a real-time latency is greater than a maximum latency value of the real-time queue; when the real-time latency is greater than the maximum latency value of the real-time queue, discarding the real-time packet input from the packet classifier; determining whether a total latency is greater than a maximum latency value of both the real-time and best-effort queues; when the total latency is greater than the maximum latency value of both the real-time and best-effort queues, adding a best-effort packet to a tail of the best-effort queue and discarding a best-effort packet from a head of the best-effort queue; determining whether a length of the real-time queue is greater than a maximum queue length of the real-time queue; when the length of the real-time queue is greater than a maximum queue length of the real-time queue, discarding the real-time packet input from the packet classifier; determining whether a length of the best-effort queue is greater than a maximum queue length of the best-effort queue; when the length of the best-effort queue is greater than a maximum queue length of the best-effort queue, adding a best-effort packet input from the packet classifier to the tail of the best-effort queue and discarding a best-effort packet from a head of the best-effort queue; determining whether there is concurrency and time to discard a real-time packet to make room for best-effort packets; when there is concurrency and time to discard the real-time packet, discarding the real-time packet to implement the keep-alive bandwidth for best-effort packets; and placing the real-time packet that was not discarded in the real-time queue.

The packet scheduling block may be periodically executed to schedule output of an incoming packet by the steps of: determining whether both the real-time and best-effort queues are empty; determining whether there is concurrency and time to transmit the best-effort packet from the best-effort queue; when there is concurrency and time to transmit the best-effort packet, checking whether total bandwidth constraint allows transmission of the best-effort packet from the best-effort queue head; when transmission is allowed, updating a time of next transmission and transmitting the best-effort packet to the outgoing device; determining whether the real-time queue is not empty and time for transmission of the real-time packet is permitted; when the real-time queue is not empty and time for transmission of the real-time packet is permitted, updating the transmission time and transmitting the real-time packet to the outgoing device from the real-time queue head; determining whether the best-effort queue is not empty and time for transmission of the best-effort packet is permitted; and when the best-effort queue is not empty and time for transmission of the best-effort packet is permitted, updating the transmission time and transmitting the best-effort packet to the outgoing device from the best-effort queue head.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAIL DESCRIPTION OF EMBODIMENTS OF THE INVENTION

The present invention is applicable for use with all types of data communication networks and communication services including packet networks. However, for the sake of simplicity, discussions will concentrate mainly on an advanced traffic shaper for use in DiffServ-enhanced IP networks for providing guaranteed QoS (Quality of Service) for interactive real-time traffic of Voice over IP (VoIP), although the scope and implementation of the present invention is not limited thereto. For example, the novel traffic shaper may be implemented for real-time traffic of video or a combination of video and audio, such as videoconferencing for delivery of video over IP (although required bandwidth is larger but the basic problems associated with delivery of video over IP remain essentially the same as Voice over IP).

In addition, there may be several special network requirements for high-priority Voice over IP (VoIP) applications. For example, the most important requirement imposed by Voice over IP (VoIP) on the network delivery is limit on end-to-end delay. The exact upper limit varies depending on the source terminal, but 250 ms is an oft-quoted value for one-way delay limit. The end-to-end delay limit is not dependent on the chosen audio decoding scheme, although an audio codec may give rise to extra delay in the form of processing and framing.

Another requirement is a limit for packet loss. Typically, a single VoIP packet varies one or more voice samples (frames), and the loss of such a packet translates to several tens of milliseconds (ms) of lost audio data. The sensitivity on packet loss rate depends on the audio codec (encoder/decoder) used. The negative effects of packet loss can be reduced to some extent with means such as interpolating over a single missing sample, including Forward Error Correction (FEC) data—for example, a low-bit rate copy of a previous audio data frame—into data packets. Regardless of the audio codec (encoder/decoder) and the interpolating means chosen in combating against packet loss, the audio quality may suffer or may be compromised after a sufficiently long sequence of missing packets. Hence if packet loss must be inflicted upon a VoIP stream, it is desirable to spread packets to be removed over time and to avoid correlated losses.

In addition to being able to prioritize real-time traffic, there are other desirable properties for the novel real-time traffic shaper. For usage with low-bandwidth links with mixed traffic types, it is useful to prevent best effort streams from being exhausted from bandwidth in case of real time stream nominal bandwidth being equal or larger than the link bandwidth. This way the time-outs associated with protocols such as FTP (File Transfer Protocol) can be avoided.

Figure 1:
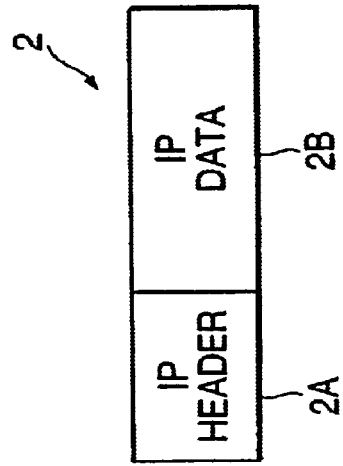
FIG. 1 illustrates an IP packet for use in an IP-based network according to the principles of the present invention.

Attention now is directed to the drawings and particularly to FIG. 1, an IP packet for use in an IP-based network according to the principles of the present invention is illustrated. As shown in FIG. 1, an IP packet 2 consists of a segment of data 2B and a small IP header 2A prepended to the data 2B. The IP packet 2 may represent, but may not be limited to, real-time traffic of Voice over IP (VoIP), or best-effort (BE) traffic, such as FTP. The IP header contains, for example, IP addresses fields (32-bit global Internet address, generally consisting of a network identifier and a host identifier), a version field used to specify which version of the IP is represented in the IP packet (for example, IP Version 4 and IP Version 6), a type of service field used to specify how the IP packet is to be handled in IP-based networks which offer various service qualities, and a header checksum field used to verify transmission error. Other IP fields such as flags and fragment offset fields, a total length field, an ID field, a time to live field and a protocol field may also be included in such an IP header.

Figure 2:
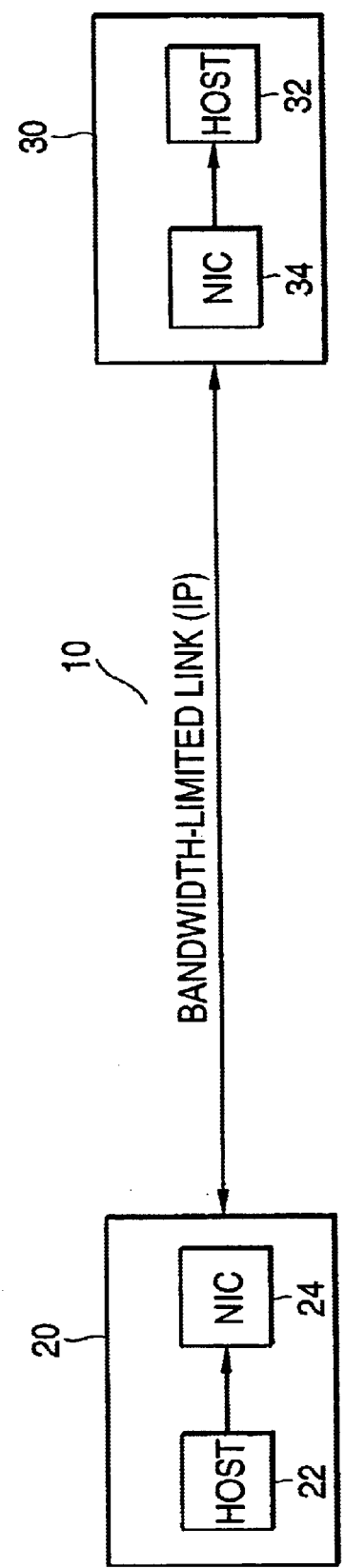
FIG. 2 illustrates an IP-based network of a source terminal and a destination terminal having an advanced traffic shaper incorporated therein for controlling traffic bandwidth usage to guarantee proper QoS (Quality of Service) for different types of real-time traffic applications while concomitantly providing keep-alive bandwidth for best-effort traffic according to the principles of the present invention.

FIG. 2 illustrates an IP-based network of a source terminal 20 and a destination terminal 20 having an advanced traffic shaper incorporated therein for controlling traffic bandwidth usage to guarantee proper QoS (Quality of Service) for different types of real-time traffic applications while concomitantly providing keep-alive bandwidth for best-effort traffic according to the principles of the present invention. As shown in FIG. 2, an IP bandwidth-limited link 10 may be utilized to connect a source terminal 20 to a destination terminal 30. The IP bandwidth-limited link 10 may represent a low bandwidth link such as, for example, an integrated service digital service (ISDN) link and a modem link that connect to the source terminal 20 and the destination terminal 30. The IP bandwidth-limited link 10 may be connected at one end of an IP-based network of an Internet Service Provider (ISP), an Internet and different source and destination networks, including, for example, a public switched telephone network (PSTN) and an integrated services digital network (ISDN) that provide linkage between the ISP network ingress host and their receivers (see FIGS. 9 and 10). The source terminal 20 includes at least a host 22 and a network interface controller (NIC) 24. Likewise, the destination terminal 30 contains at least a host 32 and a network interface controller (NIC) 34.

In the source terminal 20, the host 22 generates data which is forwarded to the network interface controller (NIC) 24. The NIC 24 of the source terminal 20 transforms incoming data from host 22 into IP packets 2 and injects the IP packets 2 into the IP-based network 10. The rate of that IP packets are injected into the IP-based network 10 and the outward flow of IP packets 2 are controlled and managed by the NIC 24 to avoid congestion and to limit bandwidth usage of IP packets in the IP-based network 10. The IP-based network 10 accepts incoming IP packets 2 and forwards the same to destination terminal 30 according to the information contained in the IP header. The NIC 34 of the destination terminal 30 receives the IP packets 2 from the IP-based network 10, transforms the same into data and forwards the data to the host 32.

Included in the NIC 24 of source terminal 20 (also in the NIC 34 of destination terminal 20 for bidirectional communications on an end-to-end basis) is a novel traffic shaper implemented to guarantee proper QoS (Quality of Service) for different types of real-time traffic applications while concomitantly providing keep-alive bandwidth for best-effort traffic according to an embodiment of the present invention. As contemplated by the present invention, the advanced traffic shaper may be implemented by an algorithm configured from the beginning with a view on providing priority forwarding for real-time traffic and avoiding correlated loss for real-time streams while providing keep-alive bandwidth for best-effort traffic at the same time. The algorithm implementation may rely on the use of standard programming methods using high level program languages such as C or C++ and a general purpose (host) processor. The algorithm may be integrated into existing operating system (OS) of a host processor and/or a computer readable medium for use in a host processor for priority forwarding for real-time traffic and avoiding correlated loss for real-time streams while providing keep-alive bandwidth for best-effort traffic.

Figure 3:
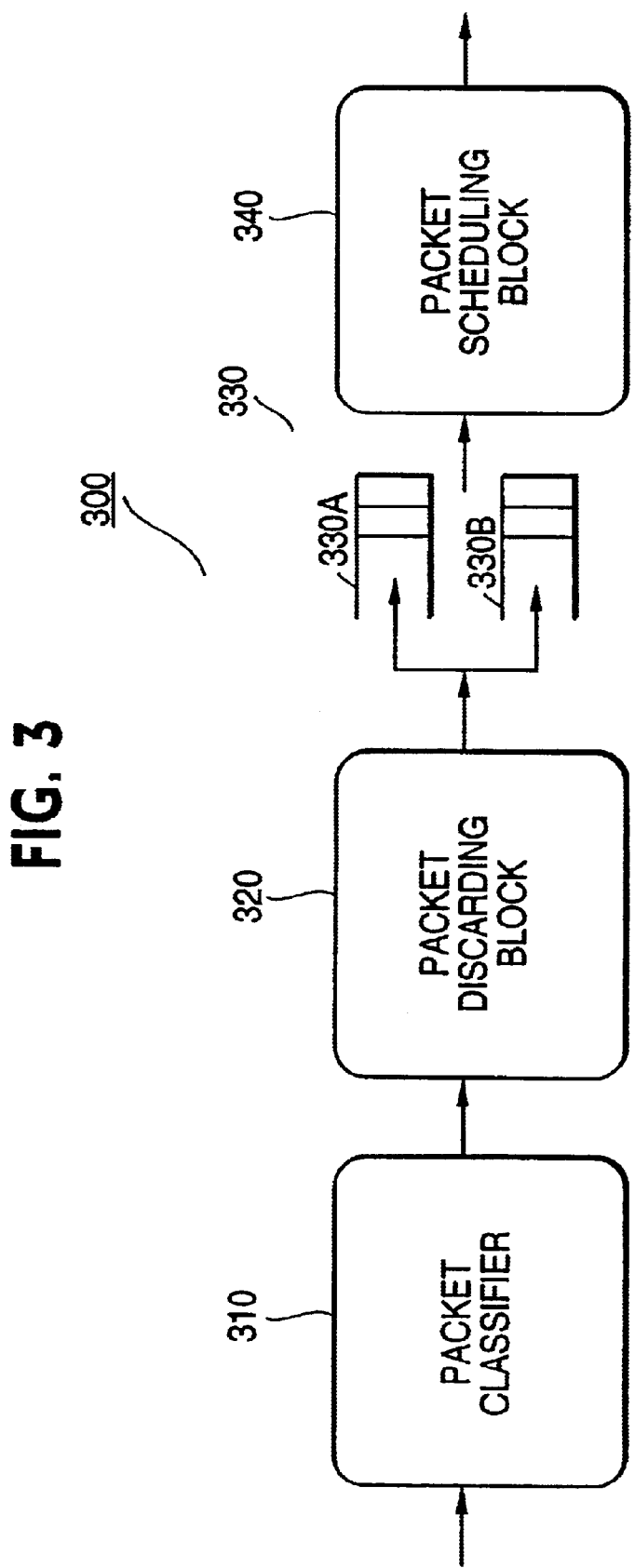
FIG. 3 is a functional implementation of an advanced traffic shaper for controlling bandwidth usage to guarantee proper QoS (Quality of Service) for different types of real-time traffic applications while concomitantly providing keep-alive bandwidth for best-effort traffic according to the principles of the present invention.

Referring now to FIG. 3, a functional block diagram of an advanced traffic shaper 300 constructed according to an embodiment of the present invention is illustrated. As shown in FIG. 3, the traffic shaper 300 includes several components, including a packet classifier 310, a packet discarding block 320, a set of connection queues 330 of real-time (RT) queue and best-effort (BE) queue for real-time (RT) packets and best-effort (BE) packets, and a packet scheduling block 340. These components may be embodied as software components or modules configured and/or written in accordance with the traffic shaping algorithm using those high level program languages such as C or C++ for priority forwarding for real-time traffic and avoiding correlated loss for real-time streams while providing keep-alive bandwidth for best-effort-traffic in an IP-based network.

The packet classifier 310 is used to receive incoming IP packets 2 and to classify such incoming IP packets 2 as either real time (RT) packets or best effort (BE) packets. Classifier functionality is well known in IP architecture and therefore, needs not be described in detail herein.

The packet discarding block 320 is used to perform traffic shaping of an incoming packet from the packet classifier 310 and discard the incoming IP packet 2 if the packet fails to comply with bandwidth parameters (that is, too many input packets with respect to the shaper output bandwidth limited). The packet discarding block 320 is triggered to perform traffic shaping on an incoming packet 2 when an incoming packet 2 arrives from the packet classifier 310. The packet discarding block 320 contains packet counters used to balance real-time (RT) packets discards in order to achieve bandwidth for best-effort (BE) traffic in situations where there is concurrency.

The connection queues 330 includes a real-time (RT) queue 330A and a best-effort (BE) queue 330B for temporary storing real-time (RT) packets and best-effort (BE) packets respectively. In a preferred embodiment of the present invention, the connection queues 330 are packet buffers constructed from FIFO (first-in-first-out) memory for storing RT packets and BE packets, respectively.

The packet scheduling block 340 is used to send RT and/or BE packets to an outgoing device (e.g., host 34 of destination terminal 30) in accordance with bandwidth parameters.

The functionality of both the packet discarding block 320 and the packet scheduling block 340 of the advanced traffic shaper 300 is controlled by the following quantities:

The length ($l_p$) and type ($t_p$) of input packet.

The current point in time, denoted t.

The queue lengths, $len_{rt}$, and $len_{be}$ for the real-time (RT), and best effort (BE) queues respectively.

The shaper bandwidth, BW.

Maximum latency values for the RT queue, and the complete queue system, denoted $LAT_{rt}$ and $LAT_{tot}$, respectively.

Maximum queue lengths for both RT and BE queues, denoted $QLEN_{rt}$ and $QLEN_{be}$. These value should be set large enough so that queue latency, not the queue length, is the cause for packet discarding.

A time parameter that allows for compensation of low jitter with less exact shaping or vice versa. It is named $t_{free}$, and is explained in greater detail below in the context of algorithm description.

Bandwidth for best-effort traffic which is maintained even at times when there is enough real time traffic to fill the whole pipe. Denoted $BW_{BE,min}$ In addition, a few internal variables are of interest for the functionality of the advanced traffic shaper 300. $p_1$ and $p_2$ are packet counters that are used to balance real-time packet discards (in order to achieve $BW_{BE,min}$ for best-effort traffic) in situations where there is concurrency. $t_{free}$ will indicate the next point in time when the advanced traffic shaper 300 is free to send the next packet according to the bandwidth specified.

The pity—parameters work as follows. In a state of concurrency (both RT and BE queues 330A–330B are active) each RT packet that passes through the traffic shaper 300 will add to the RT queue 330A according to the following formula:

$$P_1 := P_1 + (l_p * BW_{BE,min})/BW$$

$$P_2 := P_2 + (l_p * BW_{BE,min})/BW$$

which indicates the bit count of a transmission of equal time length as $l_p$ transmitted over the traffic shaper bandwidth BW but calculated in $BW_{BE,min}$. In other words, a virtual channel is maintained for best-effort traffic, even though the bit count contributed by a single RT-packet is too small to fit a single BE packet.

Whenever a new RT packet arrives and the traffic shaper 300 is in a state of concurrency, the length of the packet is compared to $p_1$, and is discarded if the packet length is larger than $p_1$, and the $p_1$ will be decremented by the same amount. If a small flow of BE traffic is desired to be maintained even as the traffic shaper 300 is completely filled with RT traffic, some extra RT packets must be discarded to make room for the BE packets. In this manner, the RT packets that will be discarded will be spread out in the throughput.

The packet discarding block 320 is triggered on an incoming packet, and operates based on an IP packet discarding algorithm as follows:

Update the memory of the shaping algorithm if necessary
if $len_{rt} + len_{be} = 0$
  $\wedge (t - t_{free}) > t_{free}$
  then
    $t_{free} := t - t_{free}$;
    $p_1 := p_2 := 0$;
fi
Discard RT packets based on latency
if $latency(len_{rt}) > LAT_{tot}$
  then
    discard (p);
fi;
Discard BE packets based on latency
if $latency(len_{rt} + len_{be}) > LAT_{tot}$
  then
    add_to_best_effort (p);
    p := first_of_best_effort( );
    discard (p);
fi;
Discard packets because queue is full
if $(t_p = REAL\ TIME) \wedge (len_{rt} \geq QLEN_{rt})$
  then
    discard (p);
fi;
if $(t_p = BEST\ EFFORT) \wedge (len_{be} \geq QLEN_{be})$
  then
    add_to_best_effort (p);
    p := first_of_best_effort( );
    discard (p)
fi;
Discard real-time packets in a concurrency situation
if $(t_p = REAL\ TIME) \wedge (l_1 \leq p_1)$
  then
    $p_1 := p_1 - l_p$
    discard (p);
fi
add_to_queue (p);

Basically, the IP packet discarding algorithm as described provides several underlying functions: The first function relates to determining whether the real-time (RT) and best-effort (BE) queues 330A–330B are empty. If the RT and BE queues 330A–330B are empty, resetting counters p1 and p2 and the scheduled transmission time of the next packet. The second function relates to the RT packet and determining whether RT latency is too large. If the RT latency is too large, discarding the RT packet. The third function relates to the BE packet and determining whether the total latency is too large. If the total latency is too large, adding a BE packet to the tail of the BE queue 330B and discarding a packet from the BE queue head (best effort early warning property). The fourth function relates to the RT packet and determining whether the RT queue length is too large. If the RT queue length is too large, discarding the RT packet. The fifth function relates to the BE packet and determining whether the BE queue length is too large. If the BE queue length is too large, adding a BE packet to the tail of the BE queue 330B and discarding a BE packet from the BE queue head (early warning). The sixth function relates to the RT packet and determining whether there is concurrency (both RT and BE queues 330A–330B are active) and p1 counter indicates that it is time to discard a RT packet to make room for BE packets. If there is concurrency and p1 counter indicates that it is time to discard the RT packet, discarding the RT packet to implement the keep-alive bandwidth BW for BE packets. The seventh function relates to determining whether an incoming packet0 that was not discarded is placed in the appropriate queues 330A–330B.

Figure 4:
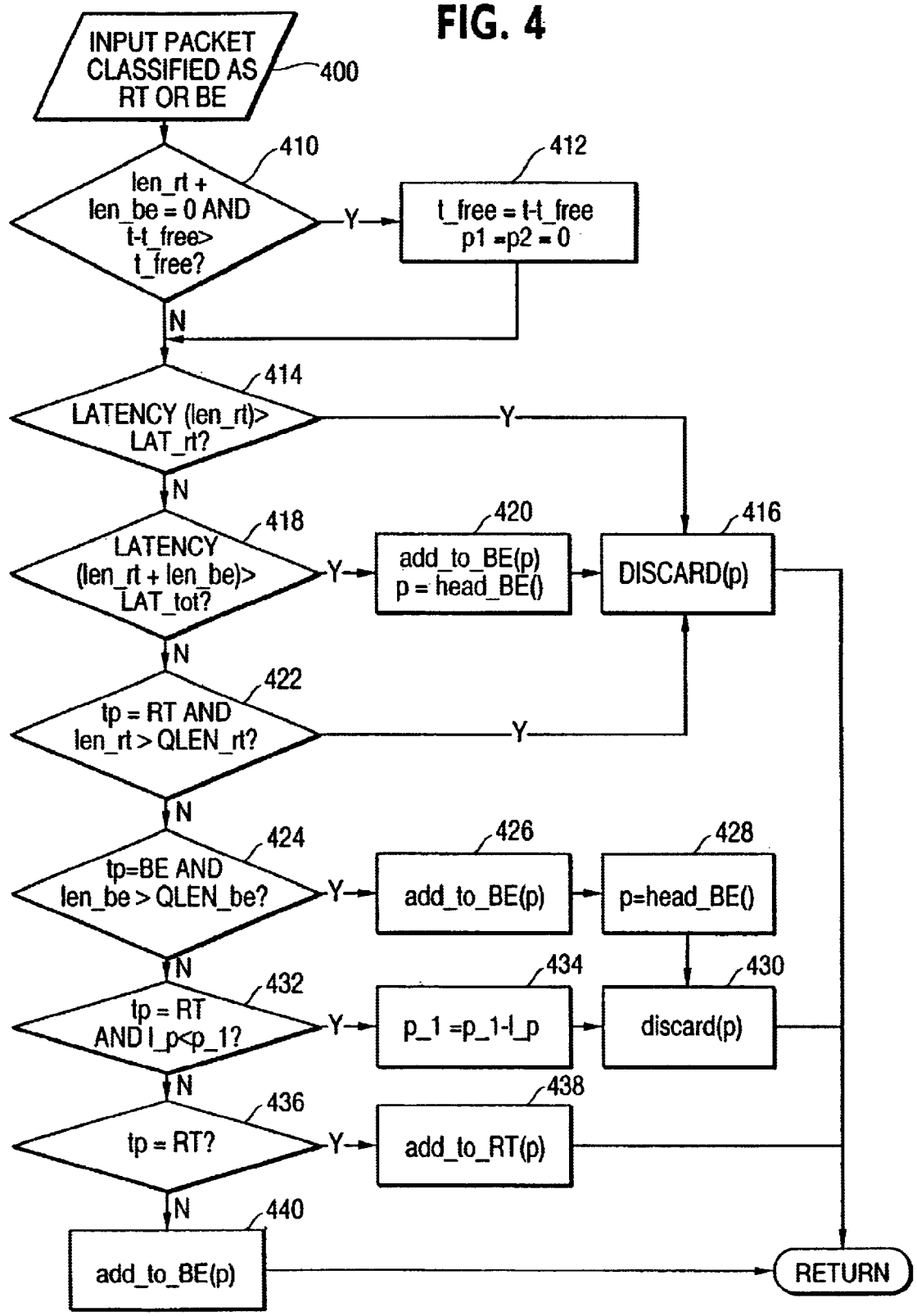
FIG. 4 is a flowchart representation of an IP packet discarding algorithm of the packet discarding block according to the principles of the present invention.

Turning now to FIG. 4, a detailed flowchart representation of an IP packet discarding algorithm of the packet discarding block 320 is illustrated. The algorithm of the packet discarding block 320 is executed by an operating system (not shown) for each incoming packet 2, classified either as real-time (RT) or best-effort (BE), from the packet classifier 310 at step 400. When an IP packet is input from the packet classifier 310, the packet discarding block 320 determines whether the RT and BE queues 330A–330B are empty ($len_{rt} + len_{be} = 0$; and $t - t_{free} > t_{free}$) at step 410. If the RT and BE queues 330A–330B are not empty at step 410, the packet discarding block 320 proceeds to step 414. If the RT and BE queues 330A–330B are empty ($len_{rt} + len_{be} = 0$; and $t - t_{free} > t_{free}$) at step 410, however, the packet discarding block 320 reset counters p1 and p2 (p1=p2=0) and the scheduled transmission time of the next packet ($t_{free} := t - t_{free}$) at step 412.

Next, the packet discarding block 320 determines whether the RT latency is larger than the maximum latency value for RT queue 330A ($latency(len_{rt}) > LAT_{rt}$) at step 414. If the RT latency is too large, the packet discarding block 320 discards the input RT packet at step 416. If the RT latency is not too large at step 414, the packet discarding block 320 proceeds to determine whether the total latency is larger than the maximum latency value for the complete queue system 330 ($latency(len_{rt} + len_{be}) > LAT_{tot}$) at step 418. If the total latency is too large, the packet discarding block 320 adds a BE packet to the tail of BE queue 330B (add_to_BE(p); and p := head_BE ( )) at step 420 and discards the packet from the BE queue head at step 416.

If the total latency is not too large at step 418, the packet discarding block 320 determines whether an input packet 2 is a RT packet and whether the RT queue length is longer than the maximum queue length (tp=RT; and $len_{rt}>QLEN_{be}$) at step 422. If the input packet is a RT packet and the RT queue length is too large, the packet discarding block 320 discards the input RT packet at step 416.

Likewise, if the RT queue length is not too large or tp=BE at step 422, the packet discarding block 320 determines whether an input packet is a BE packet and whether the BE queue length is larger than the maximum queue length (tp=BE; and $len_{be}>QLEN_{be}$) at step 424. If the input packet is a BE packet and the BE queue length is too large (tp=BE; and $len_{be}>QLEN_{be}$), the packet discarding block 320 adds the input packet to the tail of BE queue 330B (add_to_BE (p); and p:=head_BE( )) at steps 426 and 428 and discards the packet from the BE queue head at step 430.

If the BE queue length is not too large or tp=RT at block 424, the packet discarding block 320 proceeds to determine whether an input packet is a RT packet and whether there is a concurrency situation (tp=RT; and lp <p1) at step 432. If there is a concurrency situation, the packet discarding block 320 checks p1 counter (p1:=p1$-l_p$) at step 434 and discards a RT packet if the p1 counter indicates that it is time to discard the RT packet at step 430.

If there is no concurrency at step 432, the packet discarding block 320 proceeds to determine whether an input packet 2 is a RT packet or a BE packet at step 436. If the input packet 2 is a RT packet, the packet discarding block 320 places the input RT packet in the appropriate RT queue 330A (add_to_RT(p)) at step 438; otherwise, the BE queue 330B (add_to_BE(p)) at step 440.

The packet scheduling block 340 executes on a regular basis, for example, every 10 ms for sending packets to the outgoing device in accordance with the bandwidth (BW) parameters. The following scheduling algorithm describes the functionality of the packet scheduling block 340:

Release concurrency parameters if appropriate
if $len_{rt}+len_{be}=0$
    then
        $p_1 p_2=0$
fi;
Is it time to send a BE packet through during concurrency
p=first_of_best_effort( );
if ($len_{be} \leq 0$)
    $\wedge(l_p \leq p_2)$
    then
      if
        $bits(BW, t-t_{free})>l_p$
        then
          $t_{free}=t_{free}+time(BW,l_p)$;
          send (p);
        else
          continue;
      fi
fi
Send RT packet
p=first_of_real_time( );
if ($len_{rt} \geq 0$)
    then
      if
        $bits(BW, t-t_{free})>l_p$
        then
          $t_{free}=t_{free}+time(BW,l_p)$;
          send (p);
        else
          continue;
      fi
fi
Send BE packet
p=first_of_best_effort( );
if($len_{be} 0$)
    $\wedge$ $bits(BW, t-tfree)>l_p$
    then
        $t_{free}=t_{free}+time(BW, l_p)$;
        send(p);
fi;

Basically, the IP packet scheduling algorithm as described provides several underlying functions: The first function relates to determining if both the real-time (RT) and best-effort (BE) queues 330A–330B are empty and counters p1 and p2 are zero. The second function relates to the BE packet and determining whether there is concurrency (both RT and BE queues 330A–330B are active) and p2 counter indicates that a BE packet is to be transmitted. If there is concurrency and p2 counter indicates that a BE packet can be transmitted, checking if total bandwidth constraint allows sending of the BE packet from the BE queue head. If transmission is allowed, updating the time of next transmission and transmitting the BE packet. The third function relates to the RT packet and determining whether the RT queue 330A is not empty and transmission timer is permitted. If the RT queue 330A is not empty and transmission timer allows, updating the transmission timer and sending the RT packet from the RT queue head. The fourth function relates to the BE packet and determining whether the BE queue 330B is not empty and transmission timer is permitted. If the BE queue 330B is not empty and transmission timer allows, updating the transmission timer and sending the BE packet from the BE queue head.

Figure 5:
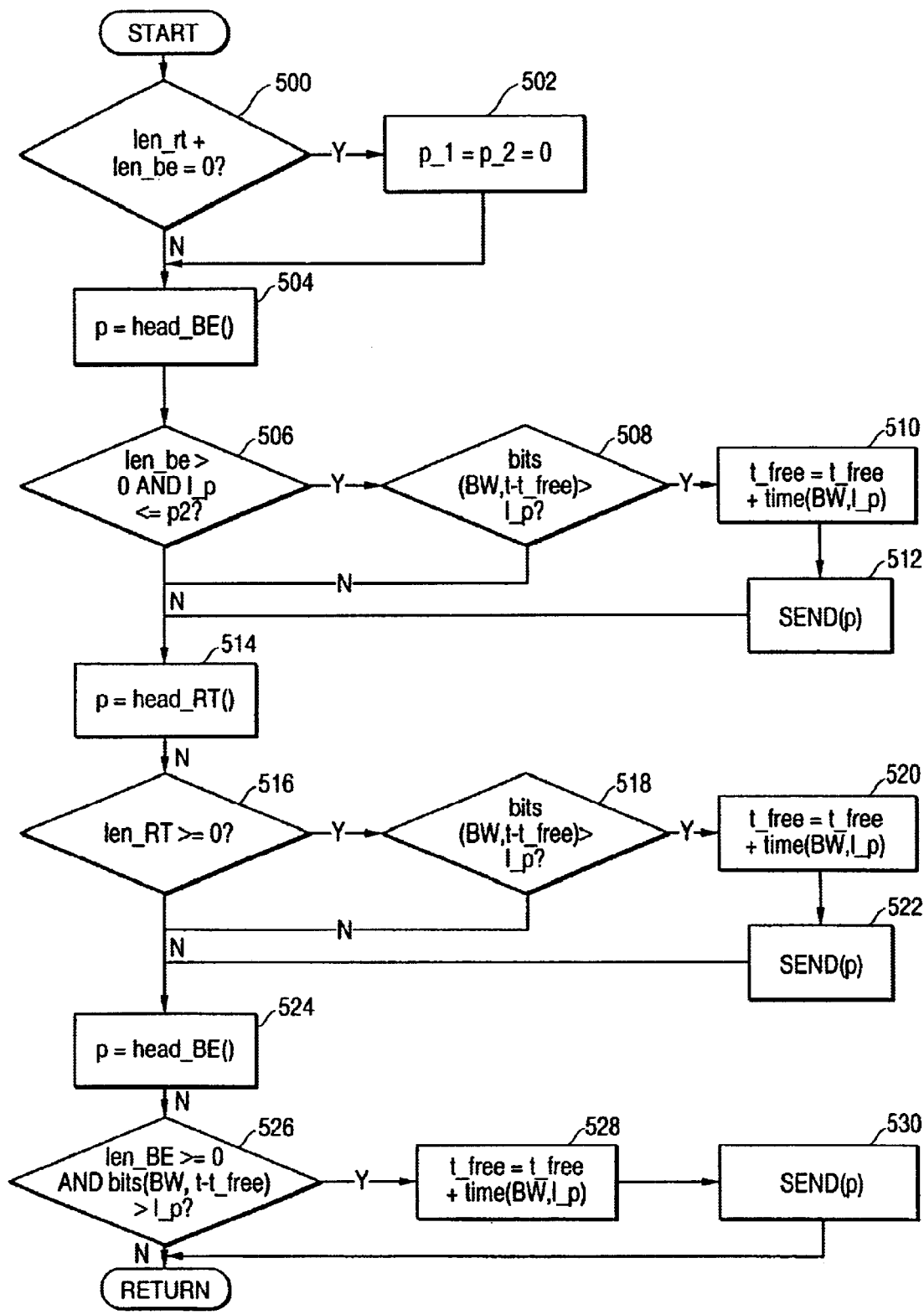
FIG. 5 is a flowchart representation of an IP packet scheduling algorithm of the packet scheduling block according to the principles of the present invention.

Referring to FIG. 5, a detailed flowchart representation of an IP packet scheduling algorithm of the packet scheduling block 340 is illustrated. The algorithm of the packet scheduling block 340 is executed periodically by an operating system (not shown) to transmit IP packets from the BE and RT queues 330A–330B. The packet scheduling block 340 determines whether both BE and RT queues 330A–330B are empty ($len_{rt}+len_{be}=0$) at step 500 and whether p1 and p2 counters are set at zero (p1=p2=0) at step 502.

After p1 and p2 counters are set at zero (p1=p2=0) at step 502, the packet scheduling block 340 determines proceeds to select the BE queue head (p=head_BE( )) at step 504. Next, the packet scheduling block 340 determines if p2 counter indicates that a BE packet can be transmitted ($len_{be}>0$; and $l_p \leq p2$) at step 506. If p2 counter indicates that a BE packet can be transmitted, the packet scheduling block 340 checks if the total bandwidth constraint allows sending of the BE packet from the BE queue head ($bits(BW, t-t_{free})>l_p$) at step 508. If BE packet transmission is allowed, the packet scheduling block 340 updates the time of next transmission ($t_{free}=t_{free}+time (BW, l_p)$) at step 510, and sends the BE packet at step 512.

Next, the packet scheduling block 340 selects the RT queue head (p=head_RT( )) at step 514, and determines if the RT queue 330A is not empty at step 516. If the RT queue 330A is not empty, the packet scheduling block 340 determines if the total bandwidth constraint allows sending of the RT packet from the RT queue head ($bits(BW, t-t_{free})>l_p$) at step 518. If RT packet transmission is allowed, the packet scheduling block 340 updates the time of next transmission ($t_{free}=t_{free}+time (BW, l_p)$) at step 520, and sends the RT packet at step 522.

Next, the packet scheduling block 340 selects the BE queue head (p=head_BE()) at step 524, and determines if the total bandwidth constraint allows sending of the BE packet from the BE queue head (bits(BW,t-$t_{free}$)>$l_p$) at step 526. If BE packet transmission is allowed, the packet scheduling block 340 updates the time of next transmission ($t_{free}$=$t_{free}$+time (BW, $l_p$)) at step 528, and sends the BE packet at step 530.

The operation of the traffic shaping algorithm (including a packet discarding algorithm and a packet scheduling algorithm) as represented by the functional block diagram as shown in FIG. 3 has been verified by simulations using an operating system (OS) such as the Linux open-source OS. A 200-byte real-time packet every 20 ms and a 1500-byte BE packet every 100 ms were provided to the traffic shaping algorithm. The number of discarded, queued and scheduled packets of each type was recorded. An emulated jiffy length (shaper call frequency) of 10 ms was used in the simulations. The shaper output bandwidth was averaged over a period of 50 packets or 1000 ms.

Figure 6:
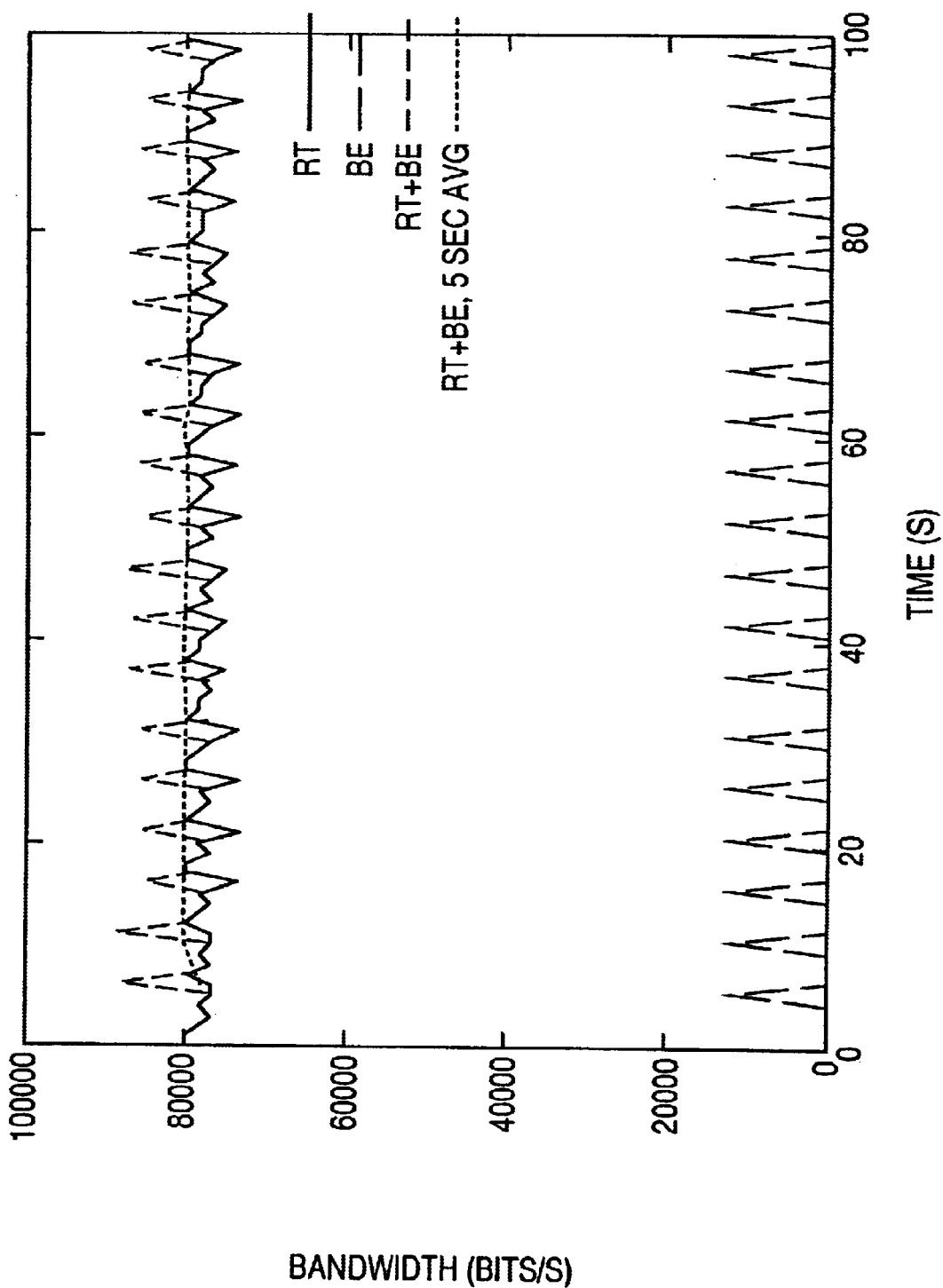
FIG. 6 illustrates the shaper output bandwidth of the advanced traffic shaper as a function of time.

The results can be seen in FIG. 6, which illustrates the shaper output bandwidth (bits/second) of the advanced traffic shaper as a function of time (second). The traffic shaper 300 is able to use the bandwidth BW efficiently. As shown in FIG. 6, the traffic shaper 300 implements the BE keep-alive bandwidth, while maintaining—on the average—the total bandwidth constraint. The following parameters are used: the total bandwidth, $BW_{tot}$=80 kbits/s, the bandwidth for BE traffic which is maintained even at times when there is enough RT traffic to fill the BW of the traffic shaper 300, $BW_{BE,min}$=2 kbits/2; the maximum latency value for the RT queue 330A, $LAT_{rt}$=50 ms, and the maximum latency value for the complete queue system 330, $LAT_{tot}$=150 ms.

Figure 7:
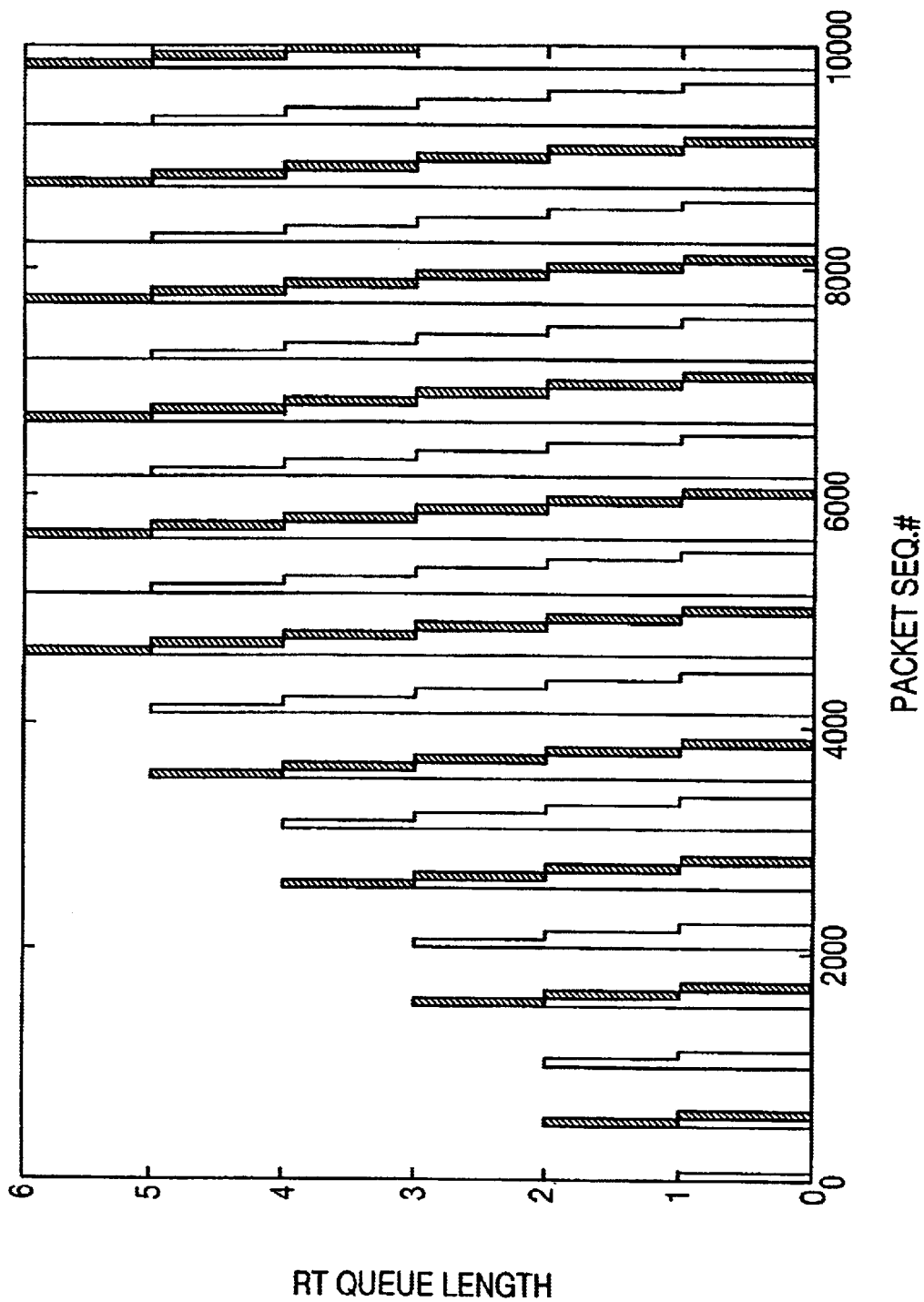
FIG. 7 illustrates the length of real-time queue as a function of packet sequence number.

FIG. 7 illustrates the length of RT queue 330A as a function of packet sequence number. A BE packet is scheduled roughly every 500 packets, and at those times, RT packets must be queued up. For demonstration purposes, a higher latency value for the RT queue of $LAT_{rt}$=100 ms is used. Other parameters remain the same as those described in FIG. 6. For example, $BW_{tot}$=80 kbits/s, $BW_{BE,min}$=2 kbits/2, and $LAT_{tot}$=150 ms.

Figure 8:
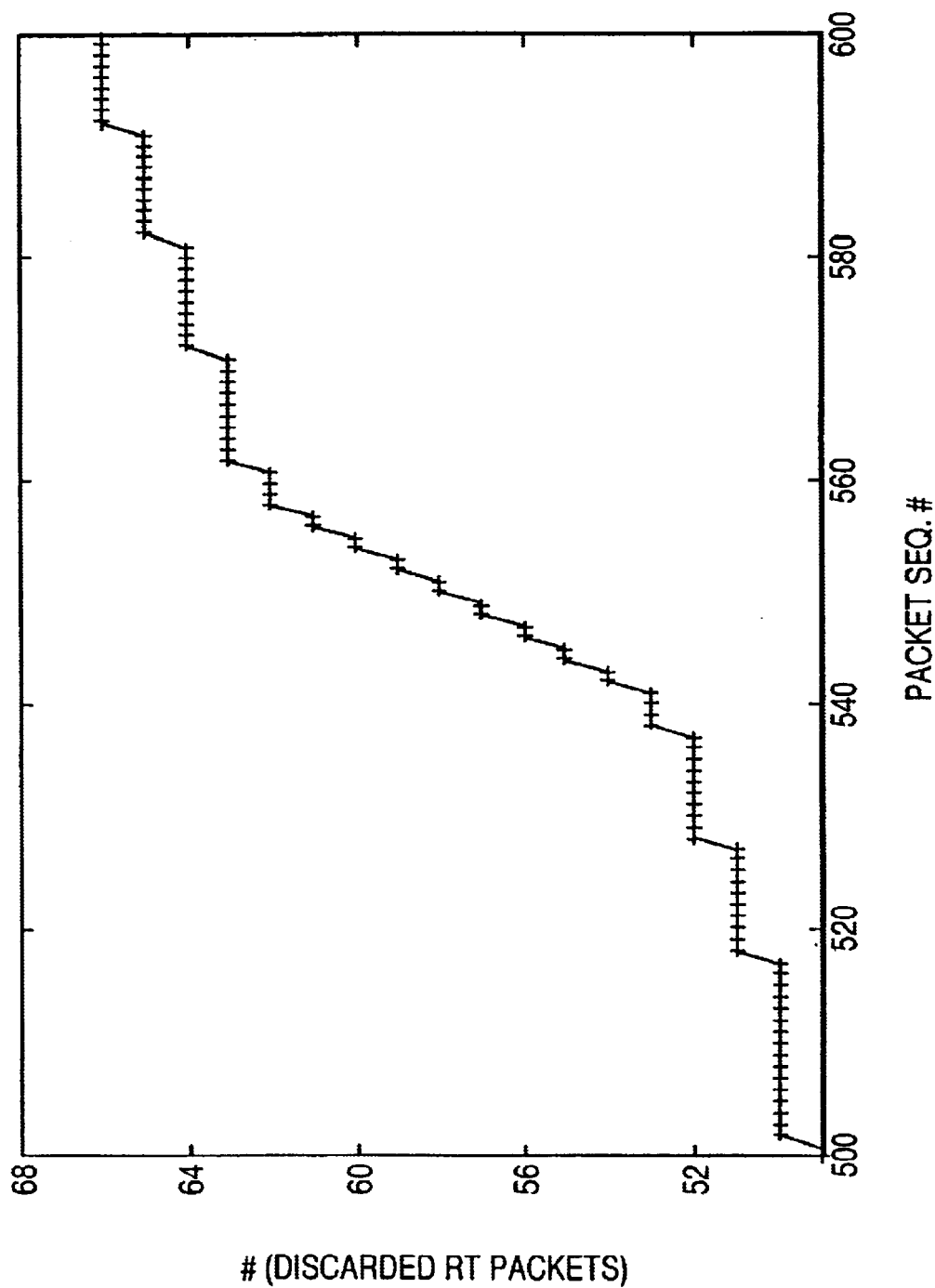
FIG. 8 illustrates the cummulative number of discarded real-time packets as a function of packet sequence number.

FIG. 8 shows the cummulative number of discarded real-time packets as a function of packet sequence number for a case in which 20% of RT packets must be discarded and RT queue latency is low (50 ms). The parameters are used: $BW_{tot}$=64 kbits/s, $BW_{BE,min}$=2 kbits/2, $LAT_{rt}$=50 ms, and $LAT_{tot}$=150 ms. The figure is centered at the moment when BE packet is scheduled and RT packets must be discarded. It can be seen that the algorithm does not discard two adjacent RT packets.

Figure 9:
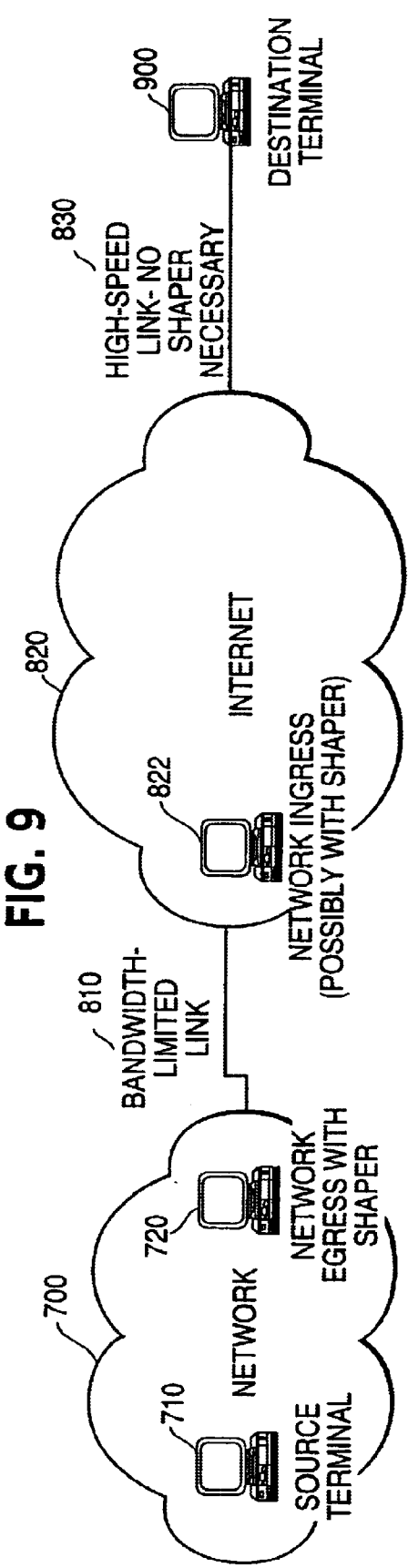
FIG. 9 illustrates one preferred usage implementation of an IP-based network of a source terminal and a destination terminal having an advanced traffic shaper incorporated therein for controlling traffic bandwidth usage to guarantee proper QoS (Quality of Service) for different types of real-time traffic applications while concomitantly providing keep-alive bandwidth for best-effort traffic according to the principles of the present invention.

FIG. 9 illustrates one preferred usage implementation of an IP-based network of a source terminal and a destination terminal having an advanced traffic shaper incorporated therein for controlling traffic bandwidth usage to guarantee proper QoS (Quality of Service) for different types of real-time traffic applications while concomitantly providing keep-alive bandwidth for best-effort traffic according to the principles of the present invention. As shown in FIG. 9, a source terminal 710 may be part of a private data network 700 such as an ISDN for sending IP packets to a destination terminal 900. An advanced traffic shaper 300 of the present invention may be installed at a network egress 720 of the data network 700 for traffic shaping the IP packets before sending to the destination terminal 900 via an Internet 820. The network egress 720 may also be a source terminal for sending IP packets to the destination terminal 900.

A bandwidth-limited link 810 may be used to provide connection between the data network 700 and the Internet 820. The IP bandwidth-limited link 10 may represent a low bandwidth link such as, for example, an integrated service digital service (ISDN) link and a modem link that connect to the network egress 720 of the data network 700 and the network ingress 822 of the Internet 820. A network ingress 822 may be an Internet Service Provider (ISP) Server provided to receive IP packets from the source terminal 710 of the data network 700. The network ingress 822 may include an advanced traffic shaper 300 of the present invention for traffic shaping of real-time traffic from the Internet side toward the source terminal 710.

A high-speed link 830 may be used to provide connection between the Internet 820 and the destination terminal 900. The high-speed link 830 may represent a high capacity Internet link of over 100 Mb/s that does not need to prioritize real-time traffic. Accordingly, the destination terminal 900 may not require the advanced traffic shaper 300 of the present invention.

Figure 10:
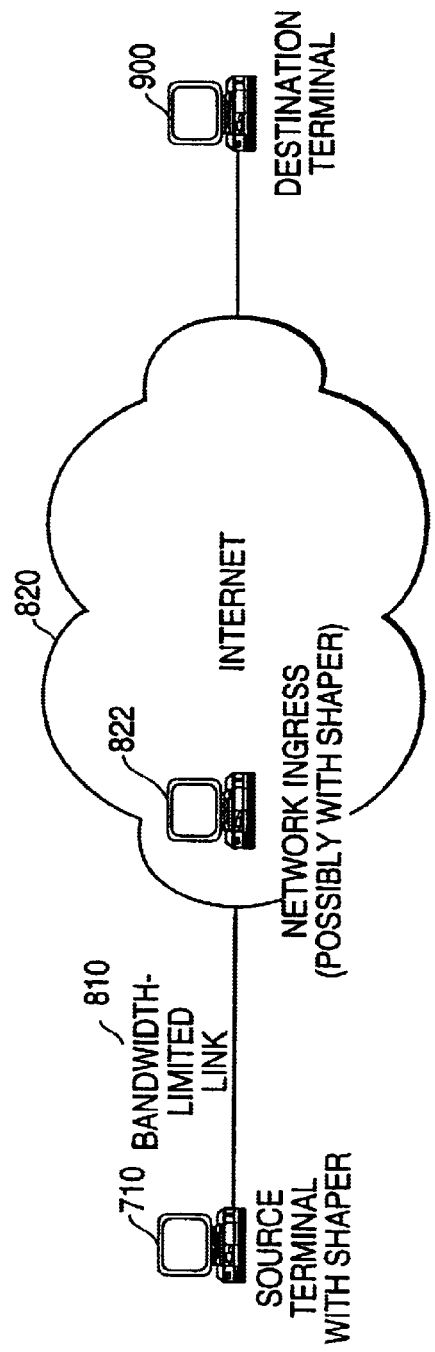
FIG. 10 illustrates another preferred usage implementation of an IP-based network of a source terminal and a destination terminal having an advanced traffic shaper incorporated therein for controlling traffic bandwidth usage to guarantee proper QoS (Quality of Service) for different types of real-time traffic applications while concomitantly providing keep-alive bandwidth for best-effort traffic according to the principles of the present invention.

FIG. 10 illustrates another preferred usage implementation of an IP-based network of a source terminal and a destination terminal having an advanced traffic shaper incorporated therein for controlling traffic bandwidth usage to guarantee proper QoS (Quality of Service) for different types of real-time traffic applications while concomitantly providing keep-alive bandwidth for best-effort traffic according to the principles of the present invention. As shown in FIG. 10, the source terminal 710 may be a stand-alone PC for home usage for sending IP packets to the destination terminal 900 via the Internet 820. The source terminal 710 may be connected to the Internet 820 through the bandwidth-limited link 810 and the network ingress 822. An advanced traffic shaper 300 of the present invention may be installed at the source terminal 710 for traffic shaping the IP packets before sending to the destination terminal 900 via an Internet 820. Similarly, the network ingress 822 may include an advanced traffic shaper 300 of the present invention for traffic shaping of real-time traffic from the Internet side toward the source terminal 710.

As described from the foregoing, the present invention advantageously provides a real-time traffic shaper configured for priority forwarding of real-time traffic while providing keep-alive bandwidth for "best-effort" traffic at the same time.

While there have been illustrated and described what are considered to be preferred embodiments of the present invention, it will be understood by those skilled in the art that various changes and modifications may be made, and equivalents may be substituted for elements thereof without departing from the true scope of the present invention. Further, many modifications may be made to adapt a particular situation to the teachings of the present invention without departing from the central scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. A traffic shaper for shaping traffic in a packet network, comprising:

a packet classifier coupled to receive an incoming packet from said packet network and to classify the incoming packet as one of a real-time packet and a best-effort packet;

a packet discarding block coupled to perform traffic shaping of the incoming packet from the packet classifier and discard the incoming packet in accordance with traffic shaping parameters;

connection queues including a real-time queue and a best-effort queue coupled to temporary store real-time packets and best-effort packets from the packet discarding block, respectively; and a packet scheduling block coupled to send the real-time and best-effort packets from the connection queues to an outgoing device in accordance with said traffic shaping parameters, wherein said packet discarding block is configured to discard the incoming packet by:

determining whether the real-time and best-effort queues are empty;

when the real-time and best-effort queues are empty, resetting the counters and a scheduled transmission time of the next incoming packet;

determining whether a real-time latency is greater than a maximum latency value of the real-time queue;

when the real-time latency is greater than the maximum latency value of the real-time queue, discarding the real-time packet input from the packet classifier;

determining whether a total latency is greater than a maximum latency value of both the real-time and best-effort queues;

when the total latency is greater than the maximum latency value of both the real-time and best-effort queues, adding a best-effort packet to a tail of the best-effort queue and discarding a best-effort packet from a head of the best-effort queue;

determining whether a length of the real-time queue is greater than a maximum queue length of the real-time queue;

when the length of the real-time queue is greater than a maximum queue length of the real-time queue, discarding the real-time packet input from the packet classifier;

determining whether a length of the best-effort queue is greater than a maximum queue length of the best-effort queue;

when the length of the best-effort queue is greater than a maximum queue length of the best-effort queue, adding a best-effort packet input from the packet classifier to the tail of the best-effort queue and discarding a best-effort packet from a head of the best-effort queue;

determining whether there is concurrency and time to discard a real-time packet to make room for best-effort packets;

when there is concurrency and time to discard the real-time packet, discarding the real-time packet to implement the keep-alive bandwidth for best-effort packets; and placing the real-time packet that was not discarded in the real-time queue.

2. The traffic shaper as claimed in claim 1, wherein said packet discarding block includes packet counters used to balance real-time packet discards in situations where there is concurrency when both the real-time and best-effort queues are active.

3. The traffic shaper as claimed in claim 1, wherein said connection queues correspond to packet buffers constructed from first-in-first-out (FIFO) memory for storing real-time packets and best-effort packets, respectively.

4. A traffic shaper for shaping traffic in a packet network, comprising:

a packet classifier coupled to receive an incoming packet from said packet network and to classify the incoming packet as one of a real-time packet and a best-effort packet;

a packet discarding block coupled to perform traffic shaping of the incoming packet from the packet classifier and discard the incoming packet in accordance with traffic shaping parameters;

connection queues including a real-time queue and a best-effort queue coupled to temporary store real-time packets and best-effort packets from the packet discarding block, respectively; and a packet scheduling block coupled to send the real-time and best-effort packets from the connection queues to an outgoing device in accordance with said traffic shaping parameters, wherein said packet scheduling block is periodically executed to schedule output of an incoming packet by:

determining whether both the real-time and best-effort queues are empty;

determining whether there is concurrency and time to transmit the best-effort packet from the best-effort queue;

when there is concurrency and time to transmit the best-effort packet, checking whether total bandwidth constraint allows transmission of the best-effort packet from the best-effort queue head;

when transmission is allowed, updating a time of next transmission and transmitting the best-effort packet to the outgoing device;

determining whether the real-time queue is not empty and time for transmission of the real-time packet is permitted;

when the real-time queue is not empty and time for transmission of the real-time packet is permitted, updating the transmission time and transmitting the real-time packet to the outgoing device from the real-time queue head;

determining whether the best-effort queue is not empty and time for transmission of the best-effort packet is permitted; and when the best-effort queue is not empty and time for transmission of the best-effort packet is permitted, updating the transmission time and transmitting the best-effort packet to the outgoing device from the best-effort queue head.

5. A network, comprising:

a source terminal comprising a host and a network interface controller;

a destination terminal comprising a host and a network interface controller;

a bandwidth-limited link providing connection between the source terminal and the destination terminal; and at least one network interface controller of the source terminal or the destination terminal comprises a traffic shaper installed therein for shaping traffic in the network, said traffic shaper comprising:

a packet classifier to receive an incoming packet and to classify the incoming packet as one of a real-time packet and a best-effort packet;

a packet discarding block to perform traffic shaping of the incoming packet from the packet classifier and discard the incoming packet in accordance with traffic shaping parameters;

connection queues including a real-time queue and a best-effort queue to temporary store real-time packets and best-effort packets from the packet discarding block, respectively; and a packet scheduling block to send the real-time and best-effort packets from the connection queues to an outgoing device in accordance with said traffic shaping parameters, wherein said packet discarding block is executed to discard an incoming packet by:
determining whether the real-time and best-effort queues are empty;
when the real-time and best-effort queues are empty, resetting the counters and a scheduled transmission time of the next incoming packet;
determining whether a real-time latency is greater than a maximum latency value of the real-time queue;
when the real-time latency is greater than the maximum latency value of the real-time queue, discarding the real-time packet input from the packet classifier;
determining whether a total latency is greater than a maximum latency value of both the real-time and best-effort queues;
when the total latency is greater than the maximum latency value of both the real-time and best-effort queues, adding a best-effort packet to a tail of the best-effort queue and discarding a best-effort packet from a head of the best-effort queue;
determining whether a length of the real-time queue is greater than a maximum queue length of the real-time queue;
when the length of the real-time queue is greater than a maximum queue length of the real-time queue, discarding the real-time packet input from the packet classifier;
determining whether a length of the best-effort queue is greater than a maximum queue length of the best-effort queue;
when the length of the best-effort queue is greater than a maximum queue length of the best-effort queue, adding a best-effort packet input from the packet classifier to the tail of the best-effort queue and discarding a best-effort packet from a head of the best-effort queue;
determining whether there is concurrency and time to discard a real-time packet to make room for best-effort packets;
when there is concurrency and time to discard the real-time packet, discarding the real-time packet to implement the keep-alive bandwidth for best-effort packets; and
placing the real-time packet that was not discarded in the real-time queue.

6. The network as claimed in claim 5, wherein said bandwidth-limited link corresponds to one of a digital services digital network (ISDN) link and a modem link with low-bandwidth for providing connection between the source terminal and the destination terminal.

7. The network as claimed in claim 5, wherein said connection queues correspond to packet buffers constructed from first-in-first-out (FIFO) memory for storing real-time packets and best-effort packets, respectively.

8. The network as claimed in claim 5, wherein said packet discarding block includes packet counters used to balance real-time packet discards in situations where there is concurrency when both the real-time and best-effort queues are active.

9. The network as claimed in claim 5, wherein said source terminal is connected to one of an integrated services digital network (ISDN).

10. The network as claimed in claim 5, further comprising an Internet Service Provider (ISP) and an Internet disposed between the bandwidth-limited link and the destination terminal.

11. The network as claimed in claim 5, wherein said traffic shaper is an algorithm configured for traffic shaping and avoiding correlated loss for real-time streams while providing keep-alive bandwidth for best-effort traffic.

12. A network comprising:
a source terminal comprising a host and a network interface controller;
a destination terminal comprising a host and a network interface controller;
a bandwidth-limited link providing connection between the source terminal and the destination terminal; and
at least one network interface controller of the source terminal or the destination terminal comprises a traffic shaper installed therein for shaping traffic in the network, said traffic shaper comprising:
a packet classifier to receive an incoming packet and to classify the incoming packet as one of a real-time packet and a best-effort packet;
a packet discarding block to perform traffic shaping of the incoming packet from the packet classifier and discard the incoming packet in accordance with traffic shaping parameters;
connection queues including a real-time queue and a best-effort queue to temporary store real-time packets and best-effort packets from the packet discarding block, respectively; and
a packet scheduling block to send the real-time and best-effort packets from the connection queues to an outgoing device in accordance with said traffic shaping parameters, wherein said packet scheduling block is periodically executed to schedule output of an incoming packet by:
determining whether both the real-time and best-effort queues are empty;
determining whether there is concurrency and time to transmit the best-effort packet from the best-effort queue;
when there is concurrency and time to transmit the best-effort packet, checking whether total bandwidth constraint allows transmission of the best-effort packet from the best-effort queue head;
when transmission is allowed, updating a time of next transmission and transmitting the best-effort packet to the outgoing device;
determining whether the real-time queue is not empty and time for transmission of the real-time packet is permitted;
when the real-time queue is not empty and time for transmission of the real-time packet is permitted, updating the transmission time and transmitting the real-time packet to the outgoing device from the real-time queue head;
determining whether the best-effort queue is not empty and time for transmission of the best-effort packet is permitted; and
when the best-effort queue is not empty and time for transmission of the best-effort packet is permitted, updating the transmission time and transmitting the best-effort packet to the outgoing device from the best-effort queue head.

13. A computer usable medium having computer readable program code means embodied therein a traffic shaper algorithm for use in a source terminal for shaping traffic in a packet network, comprising:
a packet classifier module configured to receive an incoming packet and to classify the incoming packet as one of a real-time packet and a best-effort packet;

a packet discarding module configured to perform traffic shaping of the incoming packet from the packet classifier and discard the incoming packet in accordance with traffic shaping parameters;

a connection queue module including a real-time queue and a best-effort queue configured to temporary store real-time packets and best-effort packets from the packet discarding block, respectively; and a packet scheduling module configured to send the real-time and best-effort packets from the connection queues to an outgoing device in accordance with said traffic shaping parameters, wherein said packet discarding module is configured to discard an incoming packet by:

determining whether the real-time and best-effort queues are empty;

when the real-time and best-effort queues are empty, resetting the counters and a scheduled transmission time of the next incoming packet;

determining whether a real-time latency is greater than a maximum latency value of the real-time queue;

when the real-time latency is greater than the maximum latency value of the real-time queue, discarding the real-time packet input from the packet classifier;

determining whether a total latency is greater than a maximum latency value of both the real-time and best-effort queues;

when the total latency is greater than the maximum latency value of both the real-time and best-effort queues, adding a best-effort packet to a tail of the best-effort queue and discarding a best-effort packet from a head of the best-effort queue;

determining whether a length of the real-time queue is greater than a maximum queue length of the real-time queue;

when the length of the real-time queue is greater than a maximum queue length of the real-time queue, discarding the real-time packet input from the packet classifier;

determining whether a length of the best-effort queue is greater than a maximum queue length of the best-effort queue;

when the length of the best-effort queue is greater than a maximum queue length of the best-effort queue, adding a best-effort packet input from the packet classifier to the tail of the best-effort queue and discarding a best-effort packet from a head of the best-effort queue;

determining whether there is concurrency and time to discard a real-time packet to make room for best-effort packets;

when there is concurrency and time to discard the real-time packet, discarding the real-time packet to implement the keep-alive bandwidth for best-effort packets; and placing the real-time packet that was not discarded in the real-time queue.

14. A computer usable medium having computer readable program code means embodied therein a traffic shaper algorithm for use in a source terminal for shaping traffic in a packet network, comprising:

a packet classifier module configured to receive an incoming packet and to classify the incoming packet as one of a real-time packet and a best-effort packet;

a packet discarding module configured to perform traffic shaping of the incoming packet from the packet classifier and discard the incoming packet in accordance with traffic shaping parameters;

a connection queue module including a real-time queue and a best-effort queue configured to temporary store real-time packets and best-effort packets from the packet discarding block, respectively; and a packet scheduling module configured to send the real-time and best-effort packets from the connection queues to an outgoing device in accordance with said traffic shaping parameters, wherein said packet scheduling block is configured to periodically schedule output of an incoming packet by:

determining whether both the real-time and best-effort queues are empty;

determining whether there is concurrency and time to transmit the best-effort packet from the best-effort queue;

when there is concurrency and time to transmit the best-effort packet, checking whether total bandwidth constraint allows transmission of the best-effort packet from the best-effort queue head;

when transmission is allowed, updating a time of next transmission and transmitting the best-effort packet to the outgoing device;

determining whether the real-time queue is not empty and time for transmission of the real-time packet is permitted;

when the real-time queue is not empty and time for transmission of the real-time packet is permitted, updating the transmission time and transmitting the real-time packet to the outgoing device from the real-time queue head;

determining whether the best-effort queue is not empty and time for transmission of the best-effort packet is permitted; and when the best-effort queue is not empty and time for transmission of the best-effort packet is permitted, updating the transmission time and transmitting the best-effort packet to the outgoing device from the best-effort queue head.

15. A mechanism, comprising:

a packet classifier to classify incoming packets received from a connection source, as one of real-time packets indicating real-time data streams and best-effort packets indicating best-effort data streams;

a packet discard unit to perform traffic shaping of the incoming packets and discard the incoming packets in accordance with bandwidth parameters;

connection queues including a real-time queue and a best-effort queue to temporary store real-time packets and best-effort packets, respectively, from the packet discard unit; and a packet scheduler to send the real-time packets and the best-effort packets from the connection queues to an outgoing device in accordance with said bandwidth parameters, wherein the packet discard unit is configured to discard an incoming packet by:

determining if the real-time and best-effort queues are empty;

if the real-time and best-effort queues are empty, resetting internal counters and a scheduled transmission time of the next incoming packet;

determining if a real-time latency is greater than a maximum latency value of the real-time queue;

if the real-time latency is greater than the maximum latency value of the real-time queue, discarding the real-time packet from the packet classifier;

determining if a total latency is greater than a maximum latency value of both the real-time and best-effort queues;

if the total latency is greater than the maximum latency value of both the real-time and best-effort queues, adding a best-effort packet to a tail of the best-effort queue and discarding a best-effort packet from a head of the best-effort queue;

determining if a length of the real-time queue is greater than a maximum queue length of the real-time queue;

if the length of the real-time queue is greater than a maximum queue length of the real-time queue, discarding the real-time packet input from the packet classifier;

determining if a length of the best-effort queue is greater than a maximum queue length of the best-effort queue;

if the length of the best-effort queue is greater than a maximum queue length of the best-effort queue, adding a best-effort packet input from the packet classifier to the tail of the best-effort queue and discarding a best-effort packet from a head of the best-effort queue;

determining if there is concurrency and time to discard a real-time packet to make room for best-effort packets;

if there is concurrency and time to discard the real-time packet, discarding the real-time packet to implement the keep-alive bandwidth for best-effort packets; and placing the real-time packet that was not discarded in the real-time queue.

16. The mechanism as claimed in claim 15, wherein the connection source is included in a network interface controller arranged in one of a source terminal and a destination connected in a packet network, via a bandwidth-limited link.

17. The mechanism as claimed in claim 15, wherein the bandwidth-limited link corresponds to one of a digital services digital network (ISDN) link and a modem link with low-bandwidth for providing connection between the source terminal and the destination terminal.

18. The mechanism as claimed in claim 15, wherein the packet discard unit includes packet counters used to balance real-time packet discards in situations where there is concurrency when both the real-time and best-effort queues are active.

19. A mechanism comprising:

a packet classifier to classify incoming packets received from a connection source, as one of real-time packets indicating real-time data streams and best-effort packets indicating best-effort data streams;

a packet discard unit to perform traffic shaping of the incoming packets and discard the incoming packets in accordance with bandwidth parameters;

connection queues including a real-time queue and a best-effort queue to temporary store real-time packets and best-effort packets, respectively, from the packet discard unit; and a packet scheduler to send the real-time packets and the best-effort packets from the connection queues to an outgoing device in accordance with said bandwidth parameters, wherein the packet scheduler is configured to periodically schedule an output of the incoming packet by:

determining if both the real-time and best-effort queues are empty;

if the real-time and best-effort queues are empty, resetting internal counters and a scheduled transmission time of the next incoming packet;

determining if there is concurrency and time to transmit the best-effort packet from the best-effort queue;

if there is concurrency and time to transmit the best-effort packet, checking whether total bandwidth constraint allows transmission of the best-effort packet from the best-effort queue head;

if transmission is allowed, updating a time of next transmission and transmitting the best-effort packet to the outgoing device;

determining if the real-time queue is not empty and time for transmission of the real-time packet is permitted;

if the real-time queue is not empty and time for transmission of the real-time packet is permitted, updating the transmission time and transmitting the real-time packet to the outgoing device from the real-time queue head;

determining if the best-effort queue is not empty and time for transmission of the best-effort packet is permitted; and if the best-effort queue is not empty and time for transmission of the best-effort packet is permitted, updating the transmission time and transmitting the best-effort packet to the outgoing device from the best-effort queue head.

* * * * *